United States Patent [19]
Barraclough et al.

[11] Patent Number: 5,627,825
[45] Date of Patent: May 6, 1997

[54] VIDEO COMMUNICATION APPARATUS

[75] Inventors: Keith R. Barraclough; Adrian C. Gay, both of Hampshire, United Kingdom

[73] Assignee: International Business Machines Corporation, Armonk, N.Y.

[21] Appl. No.: 300,302

[22] Filed: Sep. 2, 1994

(Under 37 CFR 1.47)

[30] Foreign Application Priority Data

Sep. 3, 1993 [GB] United Kingdom ............. 9318301

[51] Int. Cl.$^6$ ................................................ H04N 7/15
[52] U.S. Cl. ...................... 370/260; 370/537; 348/15; 348/17
[58] Field of Search .......................... 370/62, 100.1, 370/110.1, 112; 348/13, 14, 15, 17

[56] References Cited

U.S. PATENT DOCUMENTS

| | | | |
|---|---|---|---|
| 4,748,618 | 5/1988 | Brown et al. ............. | 370/62 X |
| 5,115,309 | 5/1992 | Hang ........................ | 370/79 X |
| 5,229,855 | 7/1993 | Siann ....................... | 348/588 |
| 5,291,486 | 3/1994 | Koyanagi .................. | 370/84 |
| 5,446,491 | 8/1995 | Shibata et al. ............. | 348/15 |
| 5,453,780 | 9/1995 | Chen et al. ................ | 348/15 |

*Primary Examiner*—Douglas W. Olms
*Assistant Examiner*—Russell W. Blum
*Attorney, Agent, or Firm*—Edward Duffield; Andrew J. Dillon

[57] ABSTRACT

In a video conference between N parties, each video conferencing terminal produces a respective video signal comprising, in the case of the National Television Standard Committee (NTSC) standard, sixty fields per second. The input video signals are input to an analog multi-point control unit which selects every Nth field from each input video signal and derives therefrom a single output video signal also of sixty fields per second, in which consecutive fields are derived cyclically from each of the N input video signals in turn. The single output video signal is transmitted to each video conferencing terminal, which separates out the fields of the input video signals present in the single output video signal to provide N individual reduced field rate video signals each comprising 60/N fields per second and each having fields derived from a respective one of the input video signals.

11 Claims, 4 Drawing Sheets

VIDEO COMMUNICATION APPARATUS

BACKGROUND OF THE INVENTION

1. Technical Field

The present invention relates in general to a method and system for improved video communication and in particular to an improved method and system of multiparty video communication. Still more particularly, the present invention relates to an improved method and system for multiparty video communication which derives from a plurality of input video signals a single output video signal whose fields are derived cyclically from the fields of the input video signals.

2. Description of the Related Art

Video conference users on a wide area network, for example, typically use a multipoint control unit to handle the multitude of video signals received from each party to the video conference. The commercially available multipoint control units connect users in a star configuration and accept video from each party to the conference. The multipoint control unit selects one video signal from the incoming signals and transmits the selected video signal to all other parties to the conference. Therefore, each party can only display one video signal at any one time. An example of such an apparatus is disclosed in U.S. Pat. No. 4,710,917.

As a result, it would be desirable to provide a method and system for video conferencing which allows a party to display a plurality of video signals at one time.

SUMMARY OF THE INVENTION

It is therefore one object of the present invention to provide a method and system for improved video communication.

It is another object of the present invention to provide an improved method and system for multiparty video communication.

It is yet another object of the present invention to provide an improved method and system for multiparty video communication which derives from a plurality of input video signals a single output video signal whose fields are derived cyclically from the fields of the input video signals.

The foregoing objects are achieved as is now described. A video communication apparatus including means for deriving from a plurality of input video signals a single output video signal whose fields are derived cyclically from the fields of the input video signals. In a video conference between a number N of parties, each video conferencing terminal produces a respective video signal comprising, in the case of the National Television Standard Committee (NTSC) standard, sixty fields per second. The input video signals are input to an analog multi-point control unit which selects every Nth field from each input video signal and derives therefrom a single output video signal also of sixty fields per second, in which consecutive fields are derived cyclically from each of the N input video signals in turn. The single output video signal is transmitted to each video conferencing terminal, which separates out the fields of the input video signals present in the single output video signal to provide N individual reduced field rate video signals each comprising 60/N fields per second and each having fields derived from a respective one of the input video signals.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
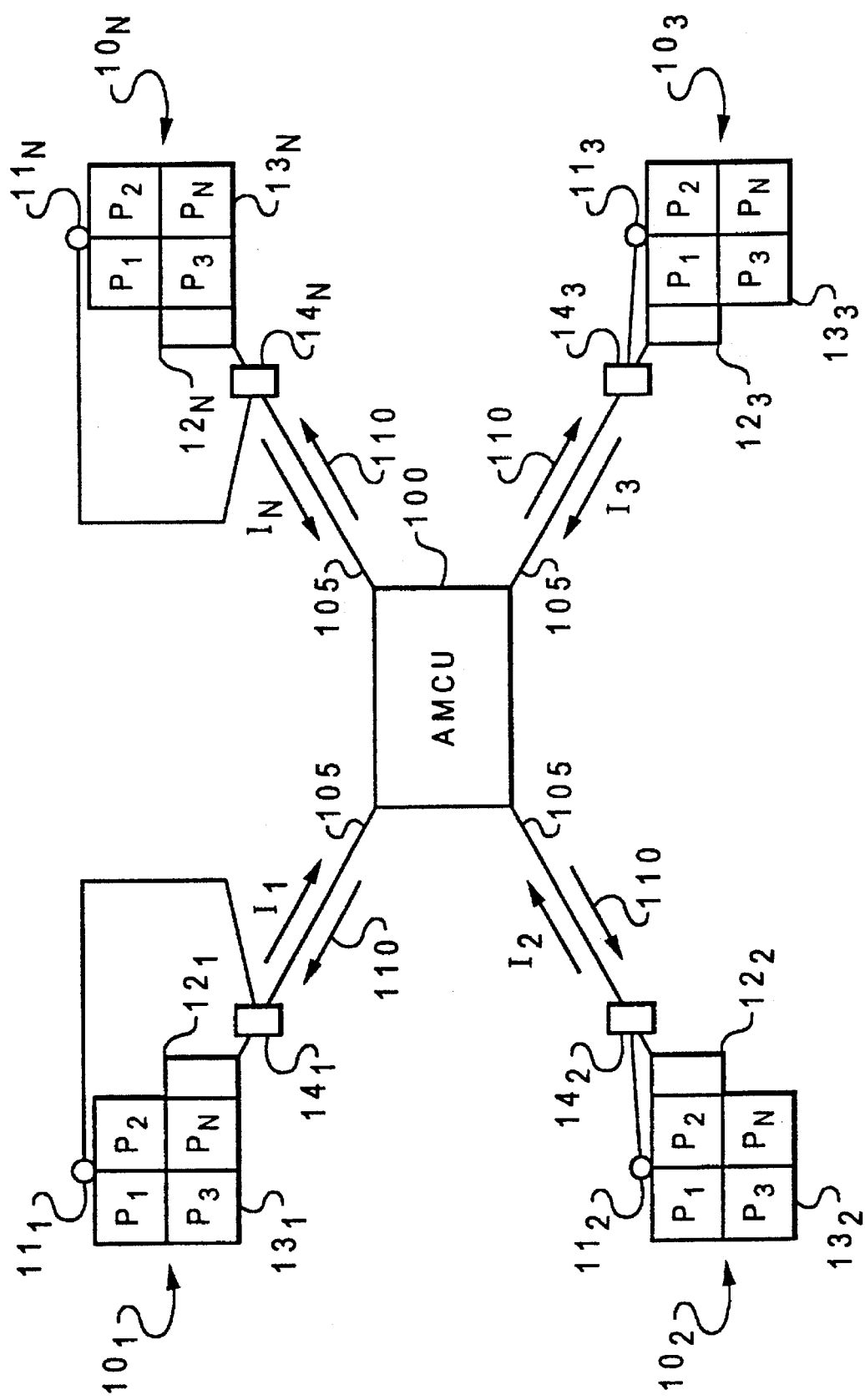
FIG. 1 is a schematic diagram of a video conferencing apparatus embodying the present invention.
Figure 2:
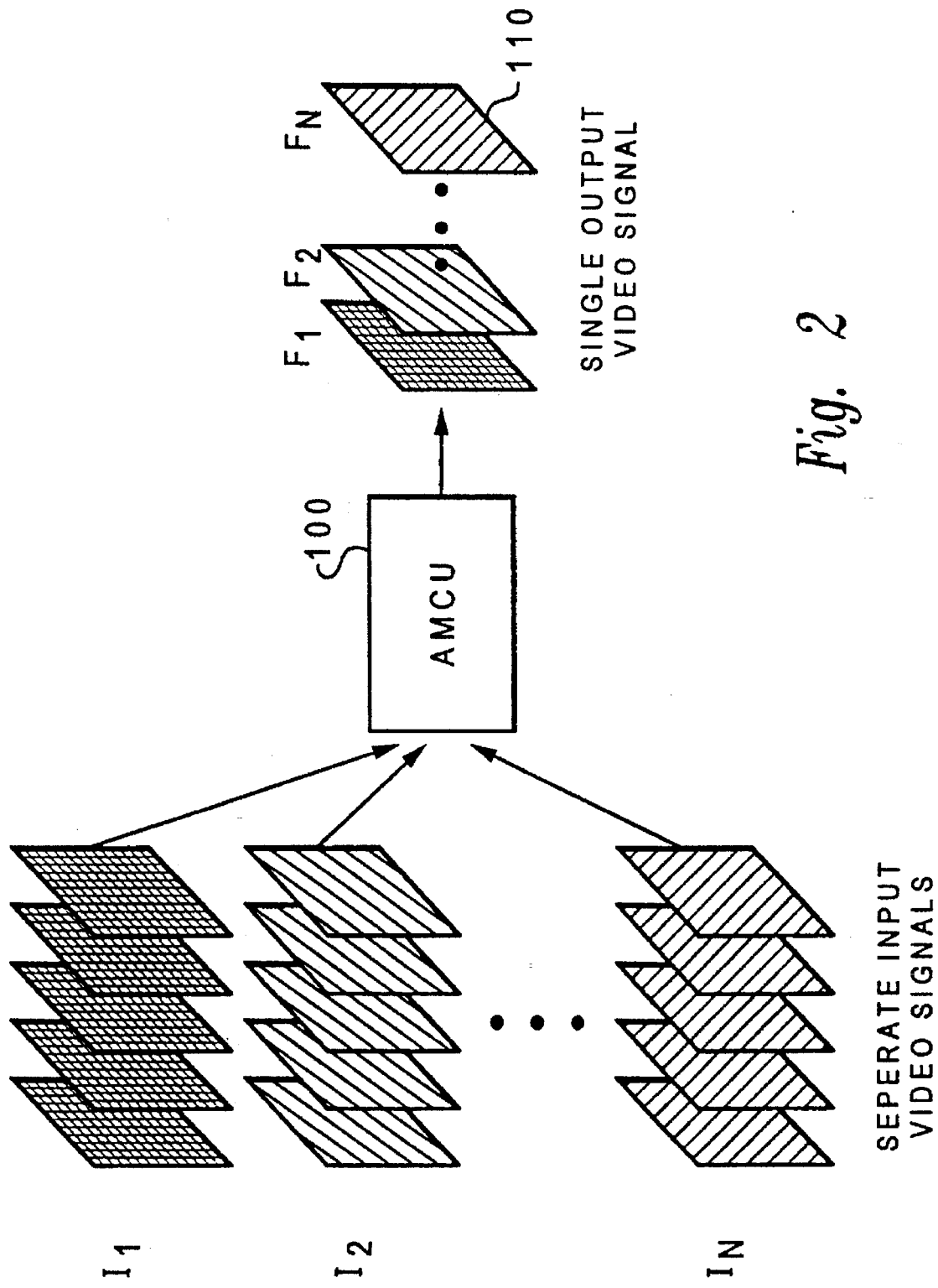
FIG. 2 illustrates the principle of operation of the Analog Multipoint Control Unit (AMCU) of FIG. 1.

Referring to FIGS. 1 and 2, a video conferencing system for a number N of parties has N mutually remote video conferencing terminals $10_1$–$10_N$. Each terminal includes video camera $11_1$–$11_N$ for producing input video signal $I_1$–$I_N$. Each video signal comprises, in the case of the National Television Standard Committee (NTSC) format, sixty fields per second. Input video signals $I_1$–$I_N$ are input, via interface unit $14_1$–$14_N$ and coaxial cable 105, to analog multi-point control unit (AMCU) 100 which selects every Nth field from each input video signal $I_1$–$I_N$ and derives therefrom a single output video signal 110, also of sixty fields per second, in which consecutive fields $F_1, F_2, \ldots, F_N$ are derived cyclically from each of the N input video signals $I_1$–$I_N$ in turn.

Each terminal $10_1$–$10_N$ also has a respective video receiver $12_1$–$12_N$. Single output video signal 110 from AMCU 100 is transmitted via coaxial cables 105 and interface units $14_1$–$14_N$ to each receiver $12_1$–$12_N$. Each receiver $12_1$–$12_N$ separates out the fields of the input video signals $I_1$–$I_N$ present in single output video signal 110 to provide N individual reduced field rate video signals, each comprising 60/N fields per second and each having fields derived from one of input video signals $I_1$–$I_N$. Each video receiver $12_1$–$12_N$ then displays, on common display screen $13_1$–$13_N$ at terminal $10_1$–$10_N$, respective picture $P_1$–$P_N$ corresponding to each input video signal $I_1$–$I_N$. If desired, each terminal $10_1$–$10_N$ may be designed to separate out and display only the pictures coming from the remote cameras.

For example, where N=4 each reduced field rate video signal will have 15 fields per second for NTSC format. However, for the purpose of video conferencing full motion video is not required, and a field rate approximately fifteen fields per second is deemed adequate.

Figure 3:
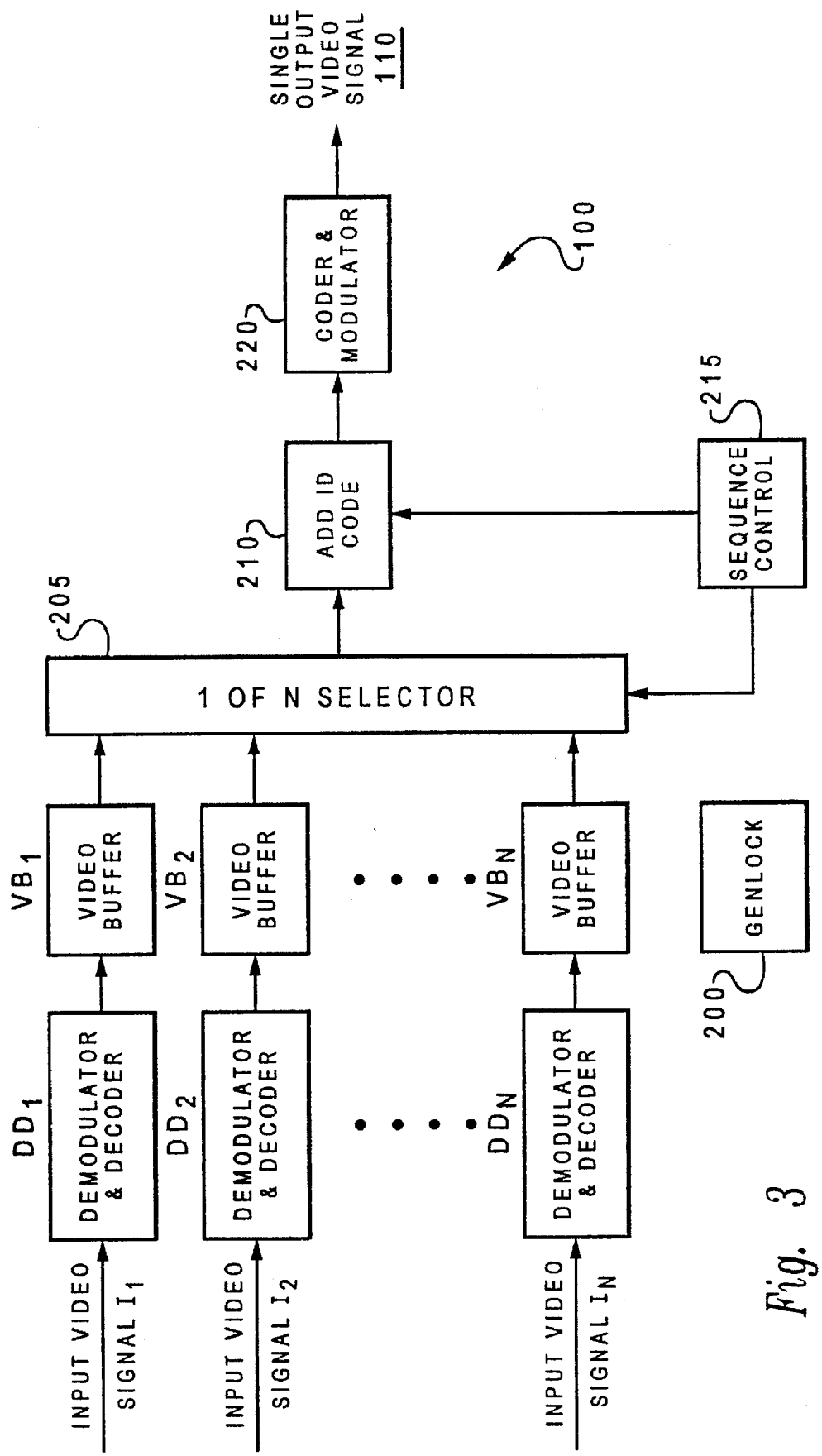
FIG. 3 is a block diagram of the AMCU.

Input video signals $I_1$–$I_N$ are modulated to between 410 MHz and 500 Mhz, using programmable or fixed frequency modulators, up to an appropriate frequency for transmission over coaxial cable 105. Consequently, the video conferencing system can be implemented using existing in-house cabling used by, for example, a local area network without having an adverse effect on the performance or operation of the local area network. Referring to FIG. 3, AMCU 100 comprises a plurality of demodulators and decoders $DD_1$–$DD_N$ and video field buffers $VB_1$–$VB_N$, genlock 200, one-of-N selector 205, means 210 for generating an identification code to be associated with each selected video field, sequence controller 215, and coder and modulator 220.

Input video signals $I_1$–$I_N$ in NTSC format are received by AMCU 100, demodulated and stored in the video field buffers $VB_1$–$VB_N$. One-of-N selector 205 has a plurality of inputs connected respectively to video field buffers $VB_1$–$VB_N$, and a single output. Under the control of sequence controller 215, one-of-N selector 205 cyclically connects the inputs individually to the single output, thereby selecting video fields for incorporation into single output video signal 110 in an order determined by sequence controller 215.

It will be appreciated that the vertical synchronization pulses of each input video signal $I_1$–$I_N$ may not be synchronized. Genlock 200 synchronizes the vertical synchronization pulses in a conventional manner, thereby rendering the input video signals suitable for subsequent interleaving such that single output video signal 110 conforms to the NTSC format. Genlock 200 ensures that the vertical syncs of individual input video signals $I_1$–$I_N$ are synchronized prior to one-of-N selector 205 selecting the next video field.

Field identification codes generated by coder 210 are used for identifying the source of each video field and are added to single output video signal 110 during flyback. This enables the use of interleaving or multiplexing sequences other than the sequential interleaving technique described above. An example of such codes are those utilized by the Society for Motion Picture and Television Engineers for editing video.

Figure 4:
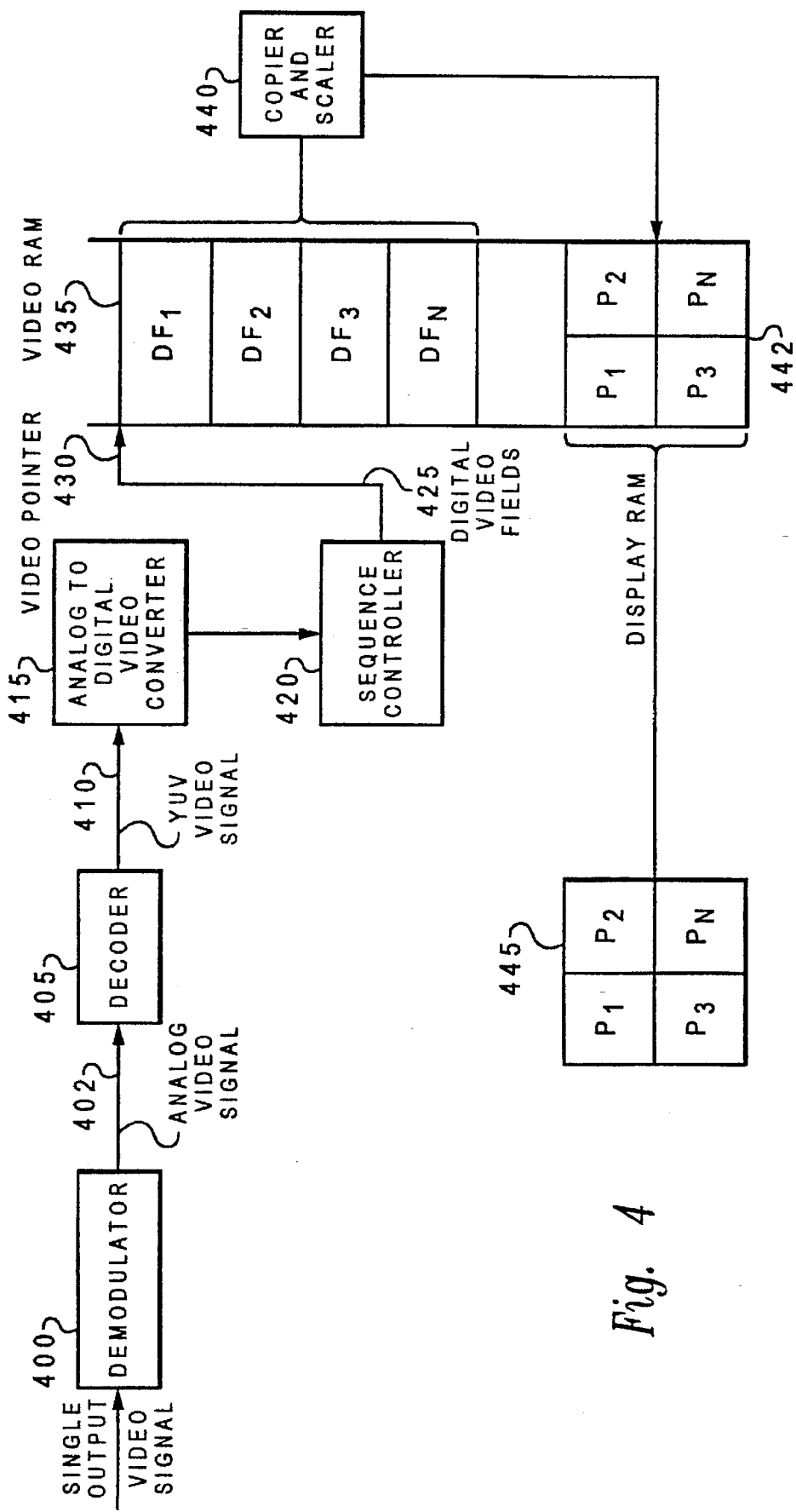
FIG. 4 is a block diagram of the receiver and display of a video conferencing terminal depicted within FIG. 1.

FIG. 4 shows schematically one of video receivers $12_1$–$12_N$ comprising demodulator 400, decoder 405, analog to digital video converter 415, sequence controller 420, video ram 435, copier and scaler 440, and display screen 445. Single output video signal 110 is received, via coaxial cable 105, from AMCU 100 and demodulated to baseband video by demodulator 400 to produce baseband single output video signal 402. Baseband video signal 402 is then decoded by NTSC decoder 405 to produce, for example, YUV video signal 410 and the field identification codes. Each video field of YUV video signal 410 is digitized by analog to digital video converter 415 to produce individual digitized video fields $DF_1$–$DF_N$.

Sequence controller 420 places each digitized video field $DF_1$–$DF_N$ in video RAM 435 at respective addresses indicated by video pointer 430. Sequence controller 420 can use the field code information to identify the source of the digitized video fields $DF_1$–$DF_N$ and adjust video pointer 430 accordingly.

Copier and scaler 440, which manipulates digital images, copies and scales the digitized video fields $DF_1$–$DF_N$ and transfers them from video RAM 435 to display RAM 442 to produce pictures $P_1$–$P_N$ in display RAM 442. The pictures $P_1$–$P_N$ are displayed on respective displays 445 (designated $13_1$–$13_N$ in FIG. 1) of each video conferencing terminal $10_1$–$10_N$ in the conventional manner.

The functions of both sequence controller 420 and copier and scaler 440 can be implemented using a suitably programmed microprocessor or an existing product such as an IBM ActionMedia II Adapter. Also, the function of copier and scaler 440 can be performed by having analog to digital video converter 415 size the digitized video fields and the sequence controller transfer them to display RAM 442.

Although the present embodiment uses video modulated at RF, baseband video may be used. This would enable an embodiment of the present invention to be realized without the need for RF modulators or demodulators. Further, the invention may be implemented in TV systems other than NTSC, for example PAL.

Also, the invention is not limited by the selection of one video field in turn from each input video signal by AMCU 100. For example, several video fields, contiguous or otherwise, can be taken from the same input video signal, and if desired, one or more complete frames (i.e., two identical interlaced fields) could be taken from each input signal.

What is claimed is:

1. A video communication apparatus for video communication between multiple parties, comprising:

a plurality of first demodulator and decoder units for demodulating and decoding a plurality of input video signals originating from said multiple parties, wherein each of said plurality of first demodulator and decoder units produces a first demodulated video signal including a sequence of fields;

a plurality of video field buffers, each of said plurality of video field buffers storing one of a plurality of first demodulated video signals produced by an associated one of said plurality of first demodulator and decoder units from one of said plurality of input video signals;

a video field selector that generates a single analog output video signal comprising a sequence of fields, wherein said video field selector selects each field within said single analog output video signal from among fields within said plurality of first demodulated video signals stored within said plurality of video field buffers; and a code generator which adds field identification codes to each field within said single analog output video signal, wherein each field identification code identifies an input video signal from which an associated field was derived; and a coder and modulator that codes and modulates said single analog output video signal for transmission to said multiple parties.

2. A method of video communication between multiple parties, said method comprising:

demodulating and decoding a plurality of input video signals originating from said multiple parties to produce a plurality of first demodulated video signals that each include a sequence of fields;

storing said plurality of first demodulated video signals;

producing a single analog output video signal comprising a sequence of fields, said sequence of fields being selected from among fields within said plurality of first demodulated video signals in a selectively determined order;

adding field identification codes to each field within said single analog output video signal, wherein each field identification code identifies an input video signal from which an associated field was derived;

coding and modulating said single analog output video signal; and transmitting said single analog output video signal to said multiple parties.

3. The video communication apparatus of claim 1, and further comprising a sequence controller that determines an order in which said video field selector selects fields from said plurality of first demodulated video signals.

4. The video communication apparatus of claim 3, wherein said sequence controller selects fields from said plurality of first demodulated video signals in round robin order.

5. The video communication apparatus of claim 1, wherein said code generator adds said field identification codes to each field within said single analog output video signal during flyback.

6. The video communication apparatus of claim 1, and further comprising a video receiver at each of said multiple parties that receives said single analog output video signal, said video receiver including:

- a second demodulator and decoder for demodulating and decoding said single analog output video signal to produce a second demodulated video signal including a sequence of fields;
- a video memory, said video memory including a plurality of portions that are each associated with one of said plurality of input video signals;
- a sequence controller that stores each field within said second demodulated video signal within a selected portion among said plurality of portions of said video memory, wherein said selected portion is associated with an input video signal indicated by a field identification code added to said each field; and
- a display for simultaneously displaying contents of each of said plurality of portions of said video memory as a distinct picture.

7. The video communication apparatus of claim 6, wherein said multiple parties comprise N parties and said single analog output video signal includes M fields per second, transmission of M fields per second being sufficient to produce full-motion video, and wherein each of said second demodulated video signals includes M/N fields per second, such that each of said second demodulated video signals provides less than full-motion video.

8. The method of video communication of claim 2, wherein said plurality of fields within said single analog output video signal are selected from fields within said plurality of first demodulated video signals in round robin order.

9. The method of video communication of claim 2, wherein said step of adding said field identification codes to each field within said single analog output video signal is performed during flyback.

10. The method of video communication of claim 2, and further comprising the steps of:

receiving said single analog output video signal;

demodulating and decoding said single analog output video signal to produce a second demodulated video signal including a sequence of fields;

identifying an input signal associated with each field within said second demodulated video signal utilizing a field identification code added to said each field;

storing each field within said second demodulated video signal in a portion of video memory associated with an input video signal indicated by a field identification code added to said each field; and simultaneously displaying a plurality of pictures that each represent contents of one of said plurality of portions of said video memory.

11. The method of video communication of claim 10, said multiple parties comprising N parties, wherein said single analog output video signal includes M fields per second and each of said second demodulated video signals includes M/N fields per second, wherein transmission of M fields per second is sufficient to produce full-motion video and each of said plurality of pictures is displayed utilizing less than full-motion video.

* * * * *